Figure 6:
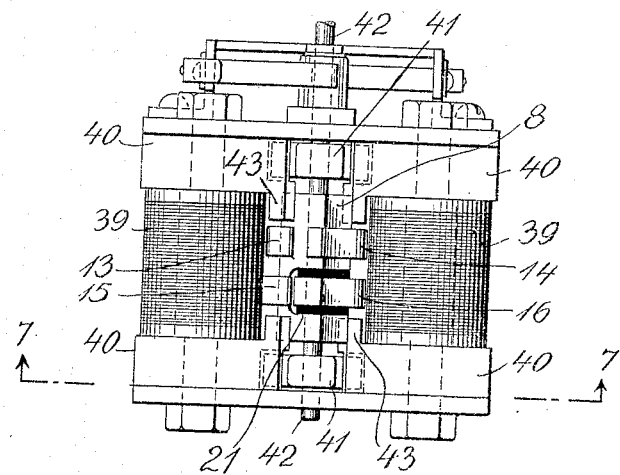

F. A. HAYES.
ELECTRIC MOTOR CONTROLLING DEVICE.
APPLICATION FILED SEPT. 30, 1908.
948,374.
Patented Feb. 8, 1910.
2 SHEETS—SHEET 1.
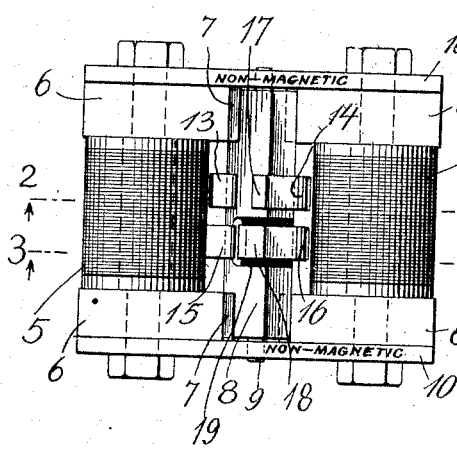
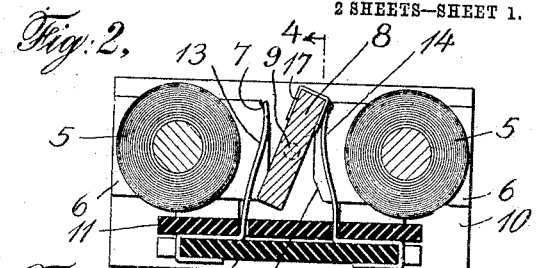
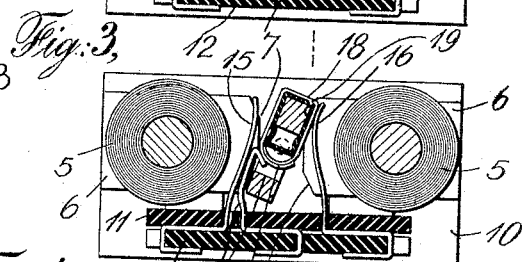
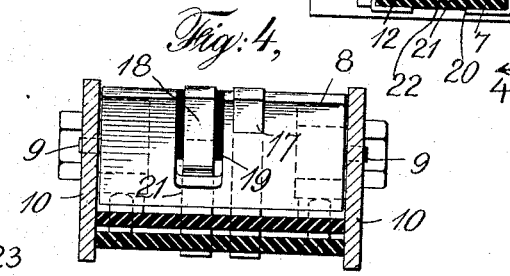
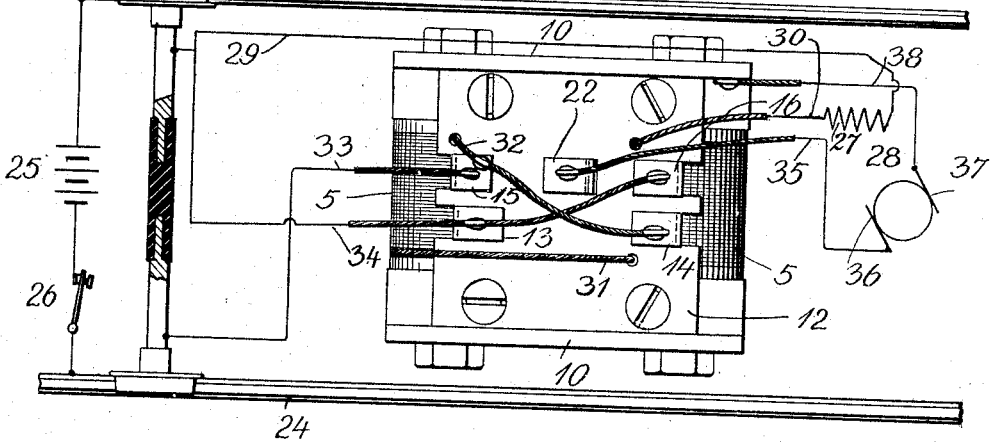
Witnesses:
Max B. A. Doring
Frank E. Roffman
Inventor
Frank A. Hayes
By his Attorneys
Markle + Natty F. A. HAYES.
ELECTRIC MOTOR CONTROLLING DEVICE.
APPLICATION FILED SEPT. 30, 1908.

948,374.

Patented Feb. 8, 1910.
2 SHEETS—SHEET 2.

Witnesses:
Max B. A. Doring
Frank E. Roffman

Inventor
Frank A. Hayes
By his Attorneys
Marble & Matly

UNITED STATES PATENT OFFICE.

FRANK A. HAYES, OF NEW YORK, N. Y.

ELECTRIC-MOTOR-CONTROLLING DEVICE.

948,374.   Specification of Letters Patent.   Patented Feb. 8, 1910.

Application filed September 30, 1908. Serial No. 455,518.

*To all whom it may concern:*

Be it known that I, FRANK ANDERSON HAYES, a citizen of the United States of America, and a resident of New York, county of New York, and State of New York, have invented certain new and useful Improvements in Electric-Motor-Controlling Devices, of which the following is a specification.

My invention relates to improvements in controlling devices for electric motors, and is particularly adapted for the control of the direction of rotation of the motor from a distant point. For this purpose I provide an electro magnetic switch, adapted to reverse the armature circuit of the motor to be controlled, with reference to the field circuit, or vice versa, the magnet of this switch being adapted to be placed in the circuit leading to the motor and to be operated by the breaking and closing of that circuit, the construction of the switch being such that when the circuit in which it is placed is broken its contact device automatically reverses the circuit controlled thereby, so that when the circuit in which the magnet of the switch is located is again closed the motor will run in the opposite direction. This reversal of the controlled circuit is effected by means of a switch armature pivoted to oscillate between opposed poles of the field magnet of the switch, and adapted to make contact with contact springs so arranged that when the circuit of the switch magnet is broken momentarily the contact springs with which the armature of that switch is then in contact automatically throw said armature toward the opposite position; and the circuit through the magnet of the switch being then closed again, the armature of the switch is attracted toward the opposite poles of the magnet. Upon again breaking the circuit through the magnet of the switch, the armature of said switch is thrown back to first position.

My improved switch is particularly intended for the control of electric toys, for example, the electric locomotives and motor cars of toy electric railways, but is not limited to application to toys and is useful in other connections, for example, electric telpher systems.

The switch may, if desired, be combined with the electric motor itself, the same field magnet serving as a field magnet of the motor and the magnet of the switch, the armature of the motor and the armature of the switch being mounted, if desired, on the same axis.

My invention consists in the novel means provided for reversing an electric motor, also in the combination of an electric motor and reversing switch, wherein the same magnets serve both for the motor and the switch.

The objects of my invention are to provide a simple and inexpensive reversing device for electric motors, controllable from a distant point, and employing a single magnet for both motor and switch.

I will now proceed to describe my invention with reference to the accompanying drawings in which one form of reversing switch is shown, also the said switch combined with the electric motor which it controls, and will then point out the novel features in claims.

Figure 7:
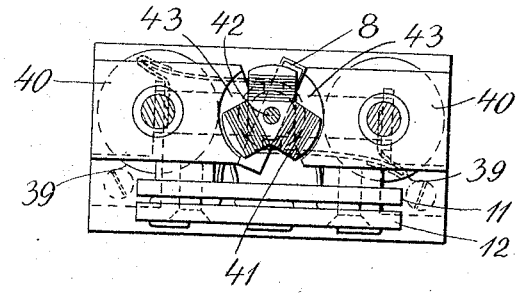

In said drawings: Figure 1 shows a top view of the switch; Fig. 2 a transverse section thereof on the line 2—2 of Fig. 1; Fig. 3 shows a transverse section thereof on the line 3—3 of Fig. 1; Fig. 4 shows a longitudinal section of the switch on the lines 4—4 of Figs. 2 and 3; and Fig. 5 shows a view of the switch turned upside down, also, diagrammatically, the electric circuits. Fig. 6 shows a top view of a combined electric motor and reversing switch, wherein the same magnet serves both as a field magnet of the motor and the magnet of the switch; and Fig. 7 shows an end view of such combined motor and switch.

Referring first to Figs. 1–5 inclusive, 5, 5 designate the spools or field coils of an electromagnet and 6, 6 the pole pieces thereof, there being four of these pole pieces arranged in opposed pairs and having beveled faces 7 as indicated particularly in Figs. 2 and 3. 8 designates a bar armature pivoted at 9 upon frame pieces 10 of nonmagnetic material, to which frame pieces the magnets are secured. 11 and 12 designate bottom plates of insulating material. 13, 14, 15 and 16 designate spring contact brushes arranged in opposed pairs 13 and 14, and 15 and 16, respectively, the two brushes of each pair arranged on opposite sides of the armature 8, and adapted to make contact with said armature. These brushes are supported by the bottom plate 12 and pass through slots in the bottom plate 11, as indicated in Figs. 2 and 3. Brushes 13 and 14 are arranged to contact with the armature itself, and to insure good contact this armature carries a strip 17 of good conductive material, which strip, however, is in electrical contact with the armature 8, itself in electrical connection with the frame pieces. Opposite the brushes 15 and 16 the armature is provided with another contact strip 18 insulated from the armature and its support by insulating material 19 and having a hub portion 20 located within a recess 21 of the armature; and a spring brush 22 engages this hub portion of contact strip 18 but in such manner that it remains in contact with said strip 18 in all positions of the armature without tending to throw the armature either to one side or the other. It, however, affords some frictional resistance, preventing rebound of the armature.

The electrical connections are shown in Fig. 5, wherein 23 and 24 represent line conductors, for example, track rails, and 25 a battery or other convenient source of electric energy connected to these track rails through a switch 26. 27 represents the field of the electric motor and 28 the armature thereof. 29 designates a conductor leading from one of the line conductors 23 to field 27 and thence by conductor 30 to one spool of the switch magnet, thence by conductor 31 to the other spool of the magnet and thence by conductor 32 to contact spring 15 and contact spring 14 of the switch. Contact spring 15 is connected by a conductor 33 to the other line conductor 24. A conductor 34 leads from line conductor 23 to contact springs 13 and 16 of the switch. It will be seen that the circuits are as follows: The field circuit of the motor and magnet circuit of the switch is from line conductor 23, through the field 27 to conductor 30, through one spool of the magnet, and conductor 31, and the other spool of the magnet and conductor 32 to spring 15, thence through conductor 33 to the other line conductor 24. The armature circuit of the motor, with the armature of the switch in the position shown in Figs. 2 and 3, is from line conductor 23, through conductor 34 to contact spring 16, armature contact piece 18, spring contact piece 22 and conductor 35 to one brush 36 of the motor, through the armature of the motor to the other brush 37, and thence through conductor 38 to one of the frame pieces 10, the armature 8, its contact piece 17, and contact spring 14, through conductor 32 to contact spring 15, thence through conductor 33 to the other line conductor 24.

To reverse the motor, the switch 26 is opened momentarily. The switch magnet being thereby deënergized, springs 14 and 16 throw the armature 8 to the opposite position where it engages springs 13 and 15; the armature being held in such position by the residual magnetism of the magnet; and when switch 26 is again closed and the switch magnet again energized, the armature will remain in contact with contact springs 13 and 15, because it is held against those poles of the switch which it is nearest, and will be attracted, placing springs 13 and 15 under further tension because of the increased strength of the magnet due to the closing of the circuit through the magnet coils. This shifting of the armature of the switch does not affect the field 27 of the motor, for as shown, the circuit of the motor field does not pass through the armature contacts of the switch. But the armature being now in the position opposite that shown in Figs. 2 and 3, the armature circuit of the motor is reversed, being now from conductor 23, through conductors 29 and 34 to spring 13, contact piece 17 of the switch armature, frame piece 10, conductor 38, brush 37, the motor armature, brush 36 and conductor 35 to contact spring 22, armature contact piece 18, contact spring 15 and conductor 33 to line conductor 24. The armature will therefore rotate in the reverse direction to that in which it is first rotated. When the switch 26 is again opened the armature 8 is thrown back by springs 13 and 15, to its first position, and when the switch 26 is again closed and the magnet energized the armature will be held in such position, the direction of rotation of the motor armature being again reversed, and the armature will be attracted and the springs 14 and 16 placed under further tension, owing to the increased strength of the magnet due to the closing of the circuit through its coils.

Obviously the same magnets may serve for the field of the motor and the field of the switch. This I have illustrated in Figs. 6 and 7, in which 39, 39 designate the coils of the magnet, and 40, 40 pole pieces of the magnet, and 41, 41 motor armatures mounted upon a shaft 42. I have illustrated the armatures of the familiar three-legged construction commonly used in toy motors, though I do not restrict myself to the use of such type of armature. The switch armature, designated here as in the preceding figures by the numeral 8, is mounted loosely upon the shaft 42 between the same pole pieces between which armatures 41 revolve; though I have shown these pole pieces 40 provided with extensions 43 opposite the ends of the switch armature 8, in order to provide broadened faces for the pole pieces. I do not limit myself, however, to this construction. The armature of the contact springs and switch armature contacts is the same as shown in Figs. 6 and 7, and therefore does not require further description. Of course, the armature 8 is free to swing upon shaft 42 entirely independent of the rotation of that shaft and the motor armatures 41 carried thereby, and therefore the operation of the switch is not affected by the motor or vice versa. The direction of throw of the switch armature will normally be the same as the direction of rotation of the motor armatures, so that the slight friction of the shaft 42 on armature 8, while the shaft is still running, helps to hold the armature 8 in the position to which it has been thrown by the switch springs or brushes.

What I claim is:—

1. A circuit reversing switch comprising a magnet having opposed pole pieces, an armature arranged to vibrate between said pole pieces, and circuit reversing and switch armature operating means comprising spring means arranged to throw the armature from either normal position toward the opposite position when the magnet is deënergized.

2. A circuit reversing switch comprising a magnet having opposed pole pieces, an armature arranged to vibrate between said pole pieces, and circuit reversing and switch armature operating means comprising spring contact brushes, and an armature contact carried by but insulated from the armature, two of said spring brushes arranged to contact with said insulated armature contact, one in one position of the armature, the other in the opposite position, two other of said spring brushes arranged to contact with the armature, one in the one position thereof and the other in the opposite position, said brushes arranged to throw the armature from either normal position toward the opposite position when the magnet is deënergized.

3. A circuit reversing switch comprising a magnet having four pole pieces arranged in pairs, the two pole pieces of each pair relatively opposed, a bar armature mounted for oscillation between the pole pieces of each pair, and circuit reversing and switch armature operating means operating to reverse a circuit when the position of the armature is reversed, and comprising spring means arranged to throw the armature from either normal position toward the opposite position when the armature is reversed.

4. A circuit reversing switch comprising a magnet having opposed pole pieces, an armature arranged to vibrate between said pole pieces, and having an insulated contact piece, and circuit reversing and switch armature operating means arranged to throw the armature from either normal position toward the opposite position when the magnet is deënergized, and comprising two sets of brushes, one set arranged to contact with the armature and with said insulated contact piece in one position of said armature, the other set arranged to contact with the armature and insulated contact piece in the opposite position of the said armature.

5. A combined motor and circuit reversing switch comprising a magnet having pole pieces, a motor armature arranged to rotate between said pole pieces, a switch armature arranged to vibrate between said pole pieces, and circuit reversing and switching armature operating means adapted to coact with said switch armature, and to throw the latter from either normal position toward the opposite position when the magnet is deenergized.

In testimony whereof I have signed this specification in the presence of two subscribing witnesses.

FRANK A. HAYES.

Witnesses:
H. M. MARBLE,
FRANK E. RAFFMAN.